(12) United States Patent
Shah et al.

(10) Patent No.: US 8,402,525 B1
(45) Date of Patent: Mar. 19, 2013

(54) WEB SERVICES SECURITY SYSTEM AND METHOD

(75) Inventors: Mehul K. Shah, Aurora, CO (US); Austin Lorenzo, Dallas, TX (US); Ruchir Rodrigues, Irving, TX (US); Paul Bolduc, Tampa, FL (US); Srinivas Anumala, Irving, TX (US); Vishnu Goyal, Irving, TX (US)

(73) Assignee: Verizon Services Corp., Ashburn, VA (US)

(*) Notice: Subject to any disclaimer, the term of this patent is extended or adjusted under 35 U.S.C. 154(b) by 1163 days.

(21) Appl. No.: 11/173,196

(22) Filed: Jul. 1, 2005

(51) Int. Cl.
*H04L 29/06* (2006.01)

(52) U.S. Cl. ............................................. 726/8; 726/28

(58) Field of Classification Search .................. None
See application file for complete search history.

(56) References Cited

U.S. PATENT DOCUMENTS

| | | | | |
|---|---|---|---|---|
| 5,235,642 | A * | 8/1993 | Wobber et al. | 713/156 |
| 6,161,139 | A * | 12/2000 | Win et al. | 709/225 |
| 6,606,663 | B1 * | 8/2003 | Liao et al. | 709/229 |
| 7,062,781 | B2 * | 6/2006 | Shambroom | 726/10 |
| 7,185,047 | B1 * | 2/2007 | Bate et al. | 709/202 |
| 7,194,761 | B1 * | 3/2007 | Champagne | 726/6 |
| 7,194,764 | B2 * | 3/2007 | Martherus et al. | 726/8 |
| 7,225,462 | B2 * | 5/2007 | Bass et al. | 726/6 |
| 7,237,030 | B2 * | 6/2007 | Chakraborty et al. | 709/229 |
| 7,240,192 | B1 * | 7/2007 | Paya et al. | 713/152 |
| 7,249,177 | B1 * | 7/2007 | Miller | 709/225 |
| 7,356,601 | B1 * | 4/2008 | Clymer et al. | 709/229 |
| 7,676,829 | B1 * | 3/2010 | Gui et al. | 726/5 |
| 8,112,792 | B2 * | 2/2012 | Pogatzki et al. | 726/8 |
| 2002/0184507 | A1 * | 12/2002 | Makower et al. | 713/182 |
| 2003/0093690 | A1 * | 5/2003 | Kemper | 713/201 |
| 2003/0177196 | A1 * | 9/2003 | Bhasin et al. | 709/213 |
| 2003/0182551 | A1 * | 9/2003 | Frantz et al. | 713/170 |
| 2003/0188193 | A1 * | 10/2003 | Venkataramappa | 713/201 |
| 2004/0139152 | A1 * | 7/2004 | Kaler et al. | 709/203 |
| 2005/0015490 | A1 * | 1/2005 | Saare et al. | 709/225 |
| 2005/0022006 | A1 * | 1/2005 | Bass et al. | 713/201 |
| 2006/0224890 | A1 * | 10/2006 | Zhou et al. | 713/170 |
| 2006/0236382 | A1 * | 10/2006 | Hinton et al. | 726/8 |
| 2006/0294366 | A1 * | 12/2006 | Nadalin et al. | 713/156 |
| 2007/0234417 | A1 * | 10/2007 | Blakley, III et al. | 726/12 |
| 2008/0072301 | A1 * | 3/2008 | Chia et al. | 726/8 |
| 2008/0155688 | A1 * | 6/2008 | Casazza | 726/21 |
| 2009/0210293 | A1 * | 8/2009 | Steele et al. | 705/10 |

* cited by examiner

*Primary Examiner* — Nathan Flynn
*Assistant Examiner* — Michael R Vaughan

(57) ABSTRACT

An exemplary method includes (1) receiving a web service request for a particular web service, along with user identification credentials, from a web service subscriber, the request and the credentials being received into a service agent of a web service publisher, (2) determining whether the credentials are cached in the service agent, and further, whether the credentials are valid, (3) in response to a determination that the credentials are not cached in the service agent, initiating a security service to authorize the web service subscriber to access the particular web service, (4) in response to a determination that the credentials are cached in the service agent and are invalid, responding to the web service subscriber with an error message, and (5) in response to a determination that the credentials are cached in the service agent and are valid, passing the web service request to the particular web service for access.

13 Claims, 6 Drawing Sheets

Fig. 6

WEB SERVICES SECURITY SYSTEM AND METHOD

BACKGROUND

Figure 1:
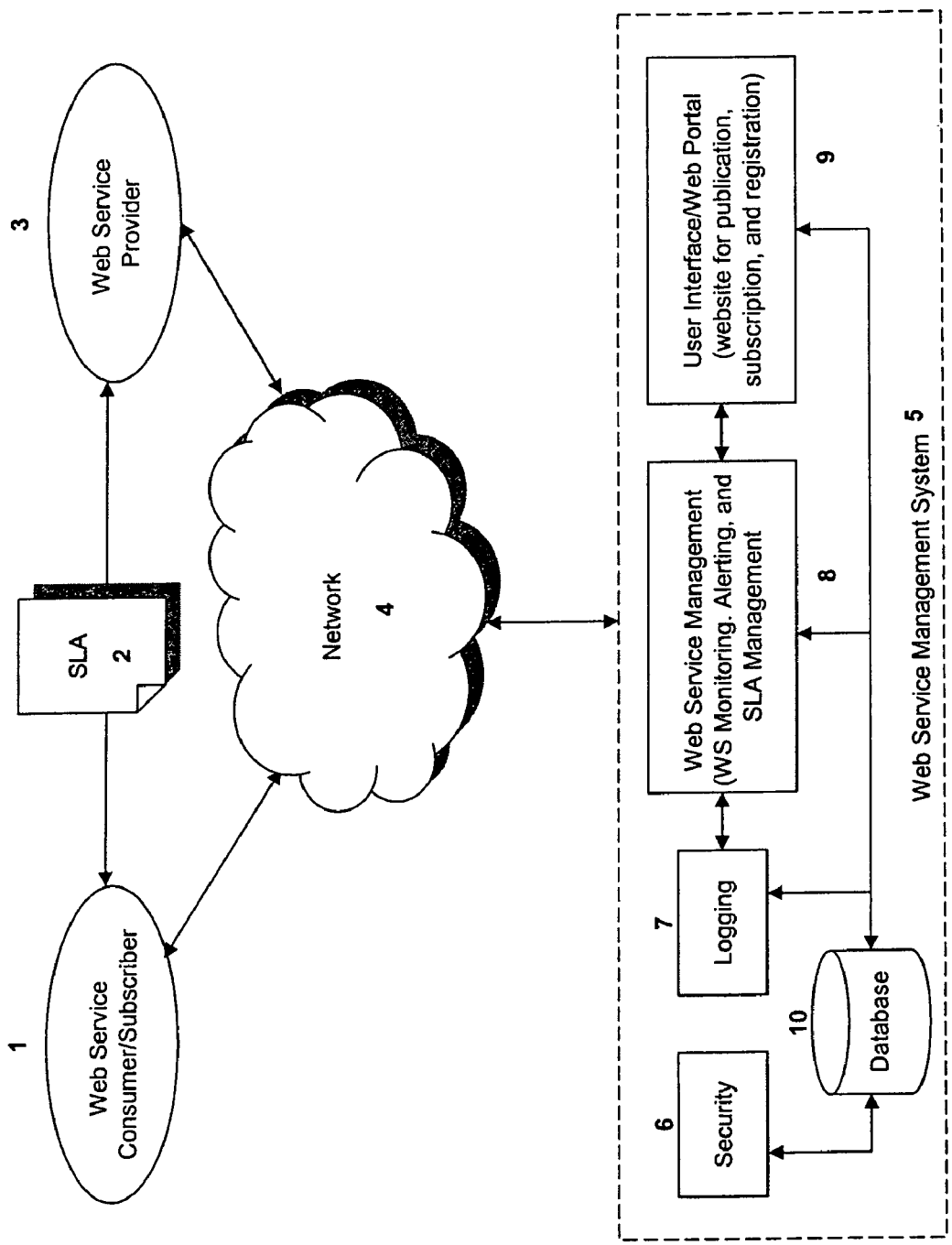

Web services represent a new model for software architecture, which is often described as "Service Oriented Architecture". Compared with the pre-existing client-server model, web services offer a compelling paradigm for the future of software development. Web services are less like static applications and more like functions that can be called as needed, to be used on their own, or incorporated into other programs. As a result, web services can be used as building blocks for other web services, and new applications or composite applications can be built from different web services that are assembled dynamically from multiple sources across the web. This new approach for system design would help overcome previous geographical, organizational, and systematic barriers to business application development. With increasing attention from software vendors, business application vendors and others, web services are being used increasingly to address real business needs, including enterprise application integration, business partner integration, portal integration, dashboards, business activity monitoring, extended functionality for web applications, and improved application development efficiency.

However, using web services may be complex and difficult sometimes because all web services are based on various core technologies including SOAP, WSDL, UDDI and XML, and each web service can be built on a different software development platform (e.g., J2EE, Microsoft .net). The lack of web services management and monitoring tools often prohibits the effective use of web services within an organization or enterprise. Therefore, there exists a need for a web services management and monitoring solution that provides common infrastructure for managing various aspects in using web services, such as logging, security, monitoring, Service-Level Agreement (SLA) management, service level metrics, notification, etc.

BRIEF DESCRIPTION OF THE SEVERAL VIEWS OF THE DRAWING(S)

Figure 2:
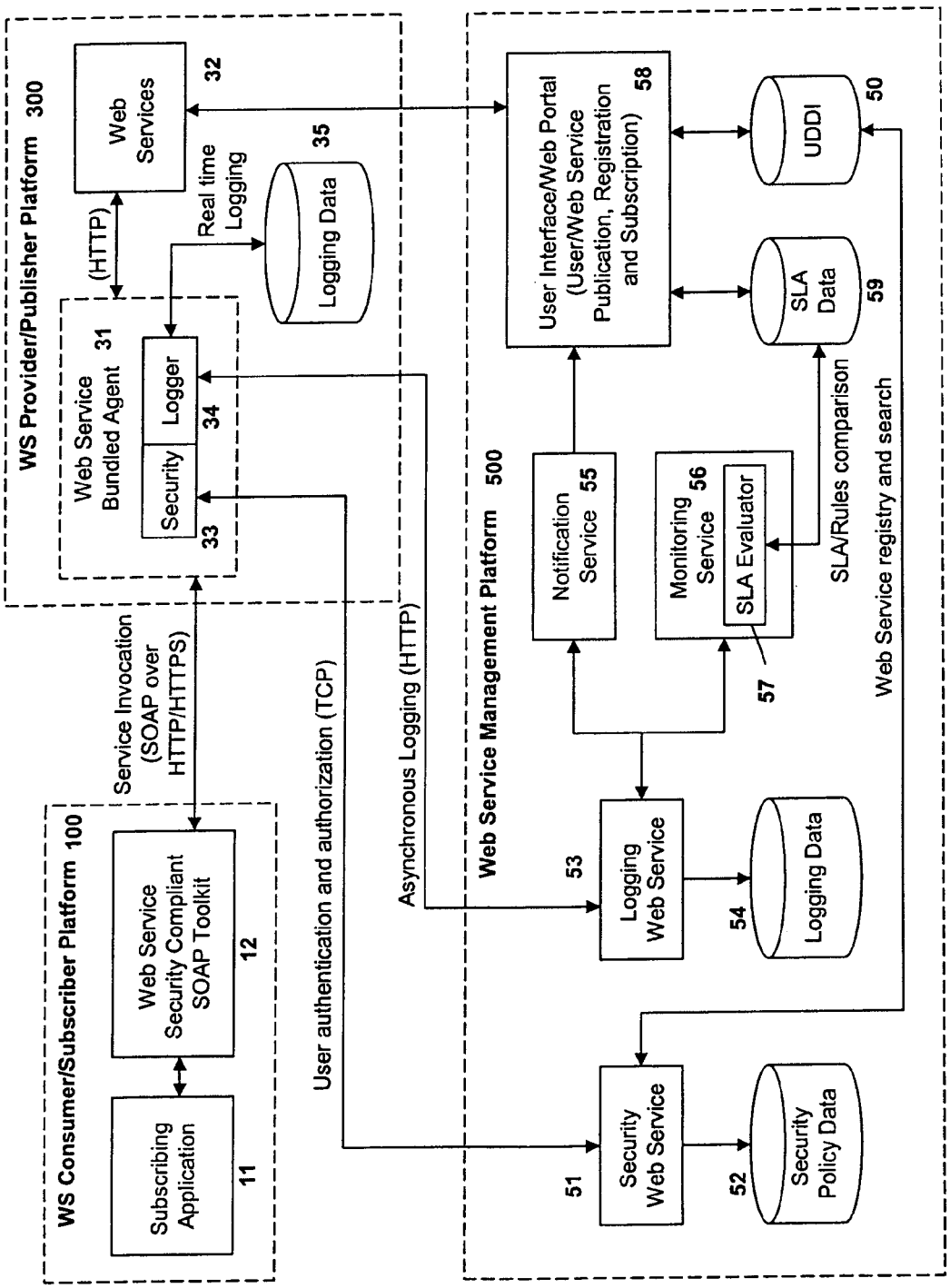
Figure 3:
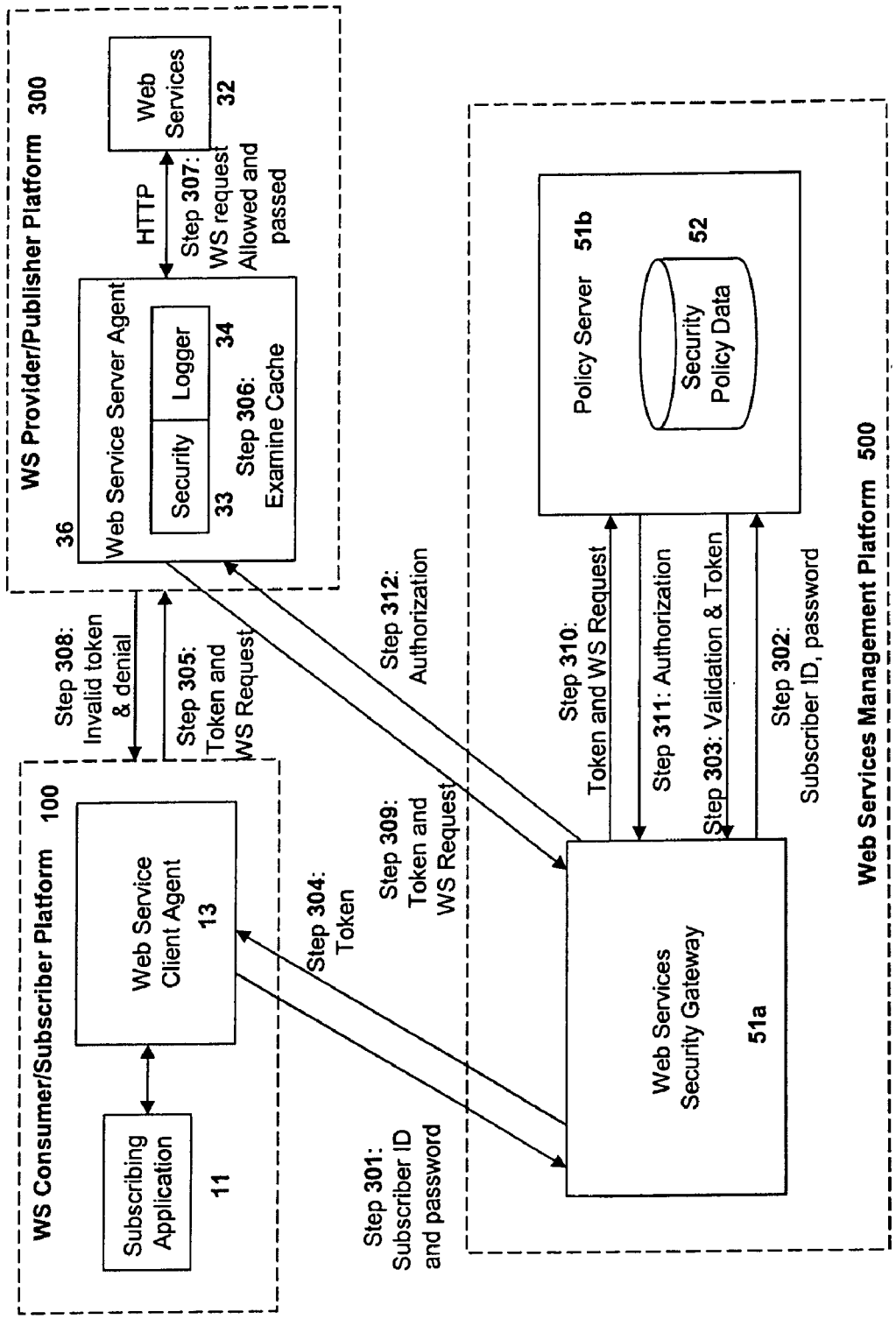
Figure 4:
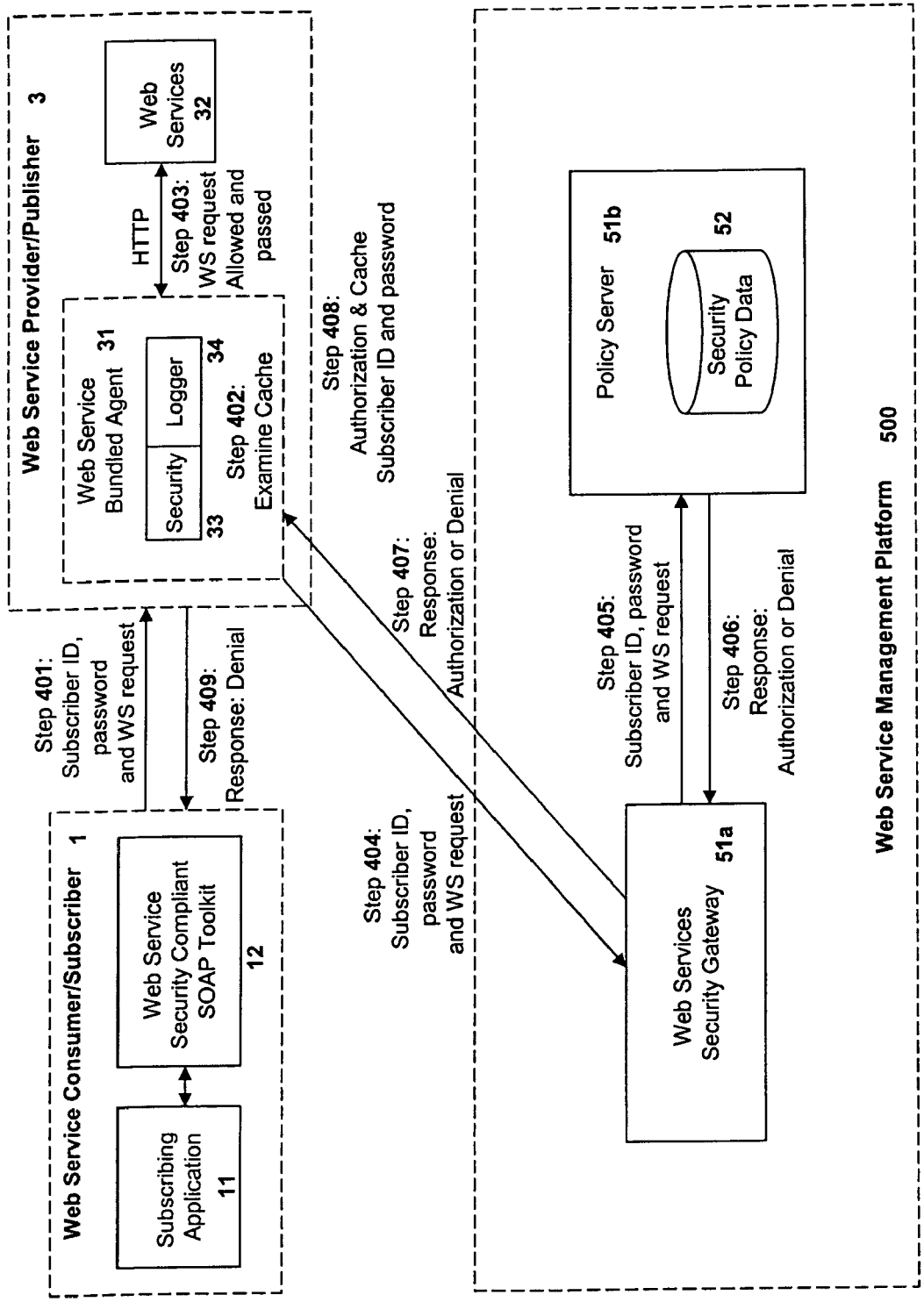
Figure 5:
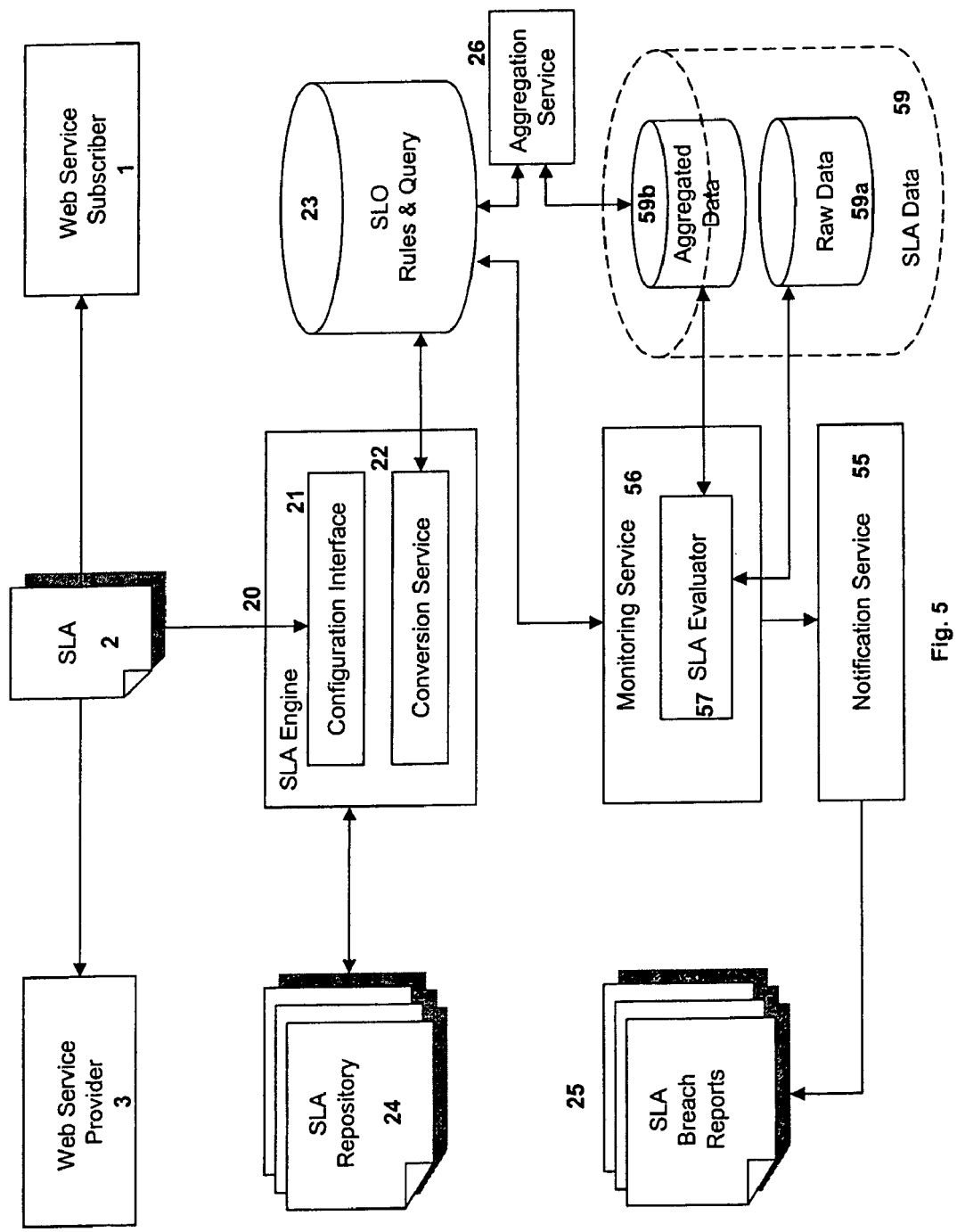

Reference will be made to the accompanying drawings, which are not necessarily drawn to scale, and wherein:

FIG. 1 provides an overview of the framework in which a system for web services management is developed and deployed, and a high-level architectural view of this system according to one embodiment of the present invention;

FIG. 2 shows in detail the infrastructure and components of the system in FIG. 1 according to one embodiment of the present invention;

FIG. 3 provides a flow diagram illustrating the runtime security process under a client-server agent pattern that was previously used in systems similar to the system of FIG. 1 according to one embodiment of the present invention;

FIG. 4 provides a flow diagram illustrating the runtime security process under a bundled agent pattern that can be implemented in the system of FIG. 1 according to one embodiment of the present invention;

FIG. 5 is a detailed view of the architecture and system components used to implement the SLA (Service-Level Agreement) management in the system of FIG. 1 according to one embodiment of the present invention; and FIG. 6 is an exemplary screen shot illustrating the SLA configuration process in the system of FIG. 1 according to one embodiment of the present invention.

DETAILED DESCRIPTION OF PREFERRED EMBODIMENTS

The preferred embodiments now will be described hereinafter with reference to the accompanying drawings, in which exemplary embodiments and examples implemented according to the invention are shown. Like numbers refer to like elements throughout.

An Overview of the Web Service Management System

FIG. 1 provides an overview of the framework in which a system for web service management is developed and deployed according to one embodiment of the present invention. As seen in FIG. 1, there are two main user entities of the web services management system 5, namely, a web service consumer or subscriber 1 and a web service provider or publisher 3. The web service consumer or subscriber 1 can be a human user or a computer application that subscribes to a web service. Similarly, the web service provider or publisher 3 can be a human provider or a computer application that offers a web service. In practice, the web service provider or publisher 3 provides to the web service consumer or subscriber 1 one SLA (Service-Level Agreement) 2 for a given web service. Typically, the SLA 2 specifies the "contractual" terms for using a particular web service. The functionality of managing or monitoring SLA performances, together with other functionalities in providing web services, is integrated in the computerized web service management system 5. The system 5 is configured to provide a very comprehensive management and services framework that facilitates management, deployment and consumption of web services by software developers, enterprises, and all other users. In one embodiment, the web service management system 5 can be accessed by both the web service consumer or subscriber 1 and the web service provider or publisher 3 through a communication network 4. The network 4 is typically a computer network (e.g. a wide area network (WAN), the Internet, or a local area network (LAN), etc.), which is a packetized or a packet switched network that can utilize Internet Protocol (IP), Asynchronous Transfer Mode (ATM), Frame Relay (FR), Point-to-Point Protocol (PPP), Voice over Internet Protocol (VoIP), or any other sort of data protocol. The network 4 allows the communication of data traffic between the web service consumer or subscriber 1, the web service provider or publisher 3 and the web service management system 5. Data traffic through the network 4 may be of any type including text, graphics, video, e-mail, facsimile, multi-media, documents, voice, audio, and other generic forms of data. The network 4 is typically a data network that may contain switching or routing equipment designed to transfer digital data traffic. It should be appreciated that the FIG. 1 framework environment is only exemplary and that embodiments of the present invention can be used with any type of telecommunication system and/or computer network, protocols, and combinations thereof.

FIG. 1 also provides a high-level architectural view of the system 5 according to one embodiment of the present invention. At a high level, the system 5 comprises a security unit 6, a logging unit 7, a web service management unit 8 including various management modules (e.g., web service monitoring, alerting, SLA management, etc.), a user interface 9 which is preferably a web portal or website for user registration, web service publication and subscription, and other user-orientated services, and a database 10 accessible to all of the above-listed system components. The database 10 contains all kinds of data generated as a result of web service management, such as SLA data, security policy data, logging data, etc. As will be appreciated by a person of ordinary skill, the database 10 as exemplified in FIG. 1 is not limited to one database, but may include various databases storing different types of data. Each of these system components will be described in detail below with reference to FIG. 2 in which a detailed view of the infrastructure and components of the system 5 according to one embodiment of the present invention is shown.

As seen in the exemplary embodiment of FIG. 2, the components of the system 5 may be distributed and positioned in three primary platforms: a web service management platform 500, a web service subscriber/consumer platform 100 and a web service publisher/provider platform 300. Residing in the web service management platform 500, the security unit 6 further comprises a security web service 51 and a database 52 containing security policy data. The security unit 6 is intended to ensure that only authorized users have access to the system 5, that only authorized subscribers have access to web services and web service operations and their access is limited to the services/operations to which they have subscribed, and that only authorized users can register new web services. To that end, the security web service 51 is invoked when a user attempts to request or access web services in the system 5. Typically, a high-level process flow is performed by the security web service 51 as follows: (1) a security gateway 51a (as shown in FIGS. 3-4) receives an encrypted user ID and password for authentication from a subscribing application 11; (2) the encrypted user ID and password are communicated to a policy server 51b (as shown in FIGS. 3-4) that is configured to search security policy data stored in the database 52 and determine whether the encrypted user ID and password are valid and authorized; and (3) the search and determination result will be transferred from the policy server 51b to the security gateway 51a which then responds back to the subscribing application 11 with an authorized or unauthorized/error message.

Similar to the above-described security unit 6, the logging unit 7 of FIG. 1 is further comprised of a logging web service 53 and a logging database 54 containing logging data, both included in the web service management platform 500 in FIG. 2. The logging web service 53 provides a flexible means of capturing login data to support management and monitoring services, such as web service requests and responses, authorization failures and operational data. The login data may include, but is not limited to, transaction start time, transaction end time, input size, output size, client IP address, client application name, server IP address, service name, method name, server URL, and user ID. In practice, the logging web service 53 collects login information from a logger application 34 at the web service provider/publisher 300, and then sends the information to the logging database 54. As seen in FIG. 2, the logging data may be logged asynchronously to the logging web service 53, such as via HTTP (Hypertext Transport Protocol). Alternatively, in the case of real-time logging, the logging data may be cached into a storage area 35 in the web service publisher/provider platform 300. In one embodiment, the logging data can be posted to the requesting subscribers in a specified XML (Extensible Markup Language) format. Below is an example of such logging data in the XML format:

<XYZRequest>
<ReqId>RequestId</ReqId>
<Portfolio>RequestId</Portfolio>
<Group>RequestId</Group>
<Application>RequestId</Application>
<ClientPortfolio>RequestId</ClientPortfolio>
<ClientGroup>RequestId</ClientGroup>
<ClientApplication>RequestId</ClientApplication>
<ServerUrl>http://xyz.com/billing/getCSR</ServerUrl>
<ServerPort>80</ServerPort>
<Service>GetCSR</Service>
<Method>GetCSR</Method>
<InputSize>400</InputSize>
<OutputSize>430</OutputSize>
<TrStartTime>02-31-2002</TrStartTime>
<TrEndTime>02-31-2002</TrEndTime>
<Environment>Development</Environment>
<Version>1.0
</XYZRequest>

In FIG. 2, the web service management unit 8 includes, but is not limited to, a notification service 55, a monitoring service 56 and an SLA evaluator 57. The monitoring service 56 is configured to monitor all web services and gather statistical data necessary to provide critical web services management. The monitoring service 56 captures and "stitches together" monitored data such as performance metrics of web services requests/replies, message delays, etc., without altering the web services' interactions in any way. Then the monitoring service 56 analyzes the monitored data to calculate parameters such as service availability, intermittent behavior, number of hits/day, number of hits/hour, average response time, high response time, low response time, peak number of transactions/hour, etc. Finally, the monitoring service 56 generates notifications in a notification database whenever a web service breaches the SLA requirements, as will be described in detail below. For illustration, the following exemplary activities can be monitored: system-level activity, performance, throughput, service availability metrics (reported on daily and monthly basis), business-level activity, transaction type, transaction volume, daily volume, hourly volume, peak number of transactions per hour, response times for transactions per day, maximum, minimum and average transaction response times on daily and hourly basis, and a "heartbeat" that provides a way for publishers to check the overall health of the system 5.

The notification service 55 is an advantageous feature of the web service management unit 8. Typically, the notification service is configured to notify via emails the contact person of a given web service about the event that generated the notification. In operation, events such as heartbeat failure, QoS (Quality of Service) violations, etc. will trigger notifications stored in a notification database that are populated by the monitor service 56 as explained above. In addition to being stored, the notifications are forwarded to the respective contact person as also noted above. Preferably, the notification service 55 is a Windows NT Service having access to the notification database.

The functionality of the SLA evaluator 57 is very similar to that of the monitoring service 56, but is more SLA-oriented. The SLA evaluator 57 is configured to monitor SLA data 59 and evaluate the web service performances by comparing certain parameters relevant to the SLA with what is required in SLAs and SLA-related rules. The SLA evaluation process will be described in detail below with reference to FIG. 5.

In one embodiment, the user interface 9 in FIG. 1 can be a web portal or website 58 as shown in FIG. 2, which is configured for user registration, web service publication and subscription, and other user-orientated services. The users of the system 5 can include anyone who accesses the website or web portal 58 to find, publish, register, or manage a web service. As will be appreciated by any person of ordinary skill, usually a user hierarchy is established to help define levels of access to the system 5. For example, with the user hierarchy, users at the higher level are able to access all system management functions including monitoring, notification and publication services, while users at the lower level may be given general access only to UDDI registry 50 to search for specific web services. As is well known in the art, the levels of access are granted after the user registration where a user provides certain information, such as user ID and password, user's first and last name, telephone number, email address, etc., to establish its identity.

The UDDI (Universal Description and Discovery of Information) database 50 is a registry where available services are published. In one exemplary embodiment of the system 5, the UDDI registry 50 is used to provide the following basic functions: enable a service provider to register (or publish) the web service into the system 5, enable a service subscriber to search for required service, and enable a service subscriber to obtain a binding key for the web service. In practice, these functions can be performed by either a UDDI programmable API or the website/web portal 58.

As shown in FIG. 2, in the web service subscriber/consumer platform 100 there are components including a subscribing application 11 and a web service security-compliant SOAP (Simple Objects Access Protocol) toolkit 12 used by the web service subscriber or consumer 1, although toolkits operating in compliance with other protocols may be employed in other embodiments. In the web service publisher/provider platform 300 there are components including a web service bundled agent 31 comprising a security facility 33 and a logger 34 and one or more web services 32 associated with the web service publisher or provider 3. Those components may be installed in client computers operated by the web service subscriber or consumer 1 or web service publisher or provider 3, or integrated as part of the web service subscriber or consumer 1 or web service publisher or provider 3. In the latter case, the web service subscriber or consumer 1 and web service publisher or provider 3 refer to specific computer applications or web services.

The subscribing application 11 allows the web service subscriber or consumer 1 to subscribe to a web service by using the SOAP toolkit 12 to form a SOAP message including the web service subscription request. As will be described in the following paragraphs with reference to FIG. 3, the SOAP message was previously formed by a web service client agent 13 which will nonetheless limit the subscriber's choices of platforms for making a web service request to those technology platforms for which the client agent 13 has been developed. The SOAP message that adheres to the web service security standard will then be transmitted to the bundled agent 31 for security and/or login verification and authentication. The bundled agent 31, as one advantageous component of the system 5, is an enabler for the web service management unit 8 by providing key functions such as logging 34 and security 33. As seen in FIG. 2, the bundled agent 31 typically co-exists with the web services 32 in the same container on the web service host platform of the web service provider or publisher 3. In one embodiment, the bundled agent 31 is configurable by the web service provider or publisher 3 using a file-based configuration scheme, such as XML format.

Bundled Agent and Security Service in Subscribing Web Services

As explained above, security is an integral function within the web service management system 5. Through the subscribing application 11, any user/subscriber (client or client application) is required to present identity credentials when requesting access to any published web services 32. Only when the subscriber's identity credentials are verified will the subscriber be authorized access to specifically requested web services and operations. As will be appreciated by an ordinary person of skill, when this identity presentation and validation process is performed on an application-to-application basis, no human interaction would be involved and thus some user identity verification practices employed in user interface security would not apply.

FIGS. 3-4 present two distinct patterns of authentication and authorization in an application-to-application presentation and validation process in the system 5. Under the client-server agent pattern in FIG. 3, the client agent 13 is designed to convert a subscribing application's credentials into a security token prior to requesting access to a web service and the server agent 36 is configured to accept SOAP messages that contain the security token and inspect the token. As compared with the bundled agent pattern in FIG. 4 where the bundled agent architecture combines the security functions of both client and server agents into a single server-side agent, this approach in FIG. 3 has several drawbacks. First, it would limit the client base to those technology environments (e.g., .Net and J2EE) for which a client agent has been developed. In addition, due to the constantly upgraded versions of those technology environments, changes would be required to be made to the client agents, thereby creating a high maintenance burden in using the system 5. Otherwise, as an alternative to creating new versions of the client agent, the subscribers would have needed to become intimately familiar with the message flow to the policy server 51b and the server agent 36 in order to write code to fetch their own tokens and deal with the different exceptions that may occur. These problems are overcome under the bundled agent model in FIG. 4 where the subscribing application is free to use any technology platform that can form the appropriate SOAP message and include basic identification information (credentials), not limited to those for which the client agent has been developed, and the subscriber may use any SOAP Toolkit that can form a SOAP message that adheres to the web services security standard. The respective runtime security process flows in FIGS. 3-4 will be described in the following paragraphs.

In FIG. 3, the runtime security process under a client-server agent pattern starts with the client agent 13 receiving a registered application ID and password from the subscribing application 11. Then the process proceeds to Step 301 where these credentials are passed to the web service security gateway 51a. At Step 302, the security gateway Ma transfers the credentials to the policy server 51b that accesses the policy database 52 to validate the application ID and password pair. If the credentials are valid, the policy server 51b returns a security token valid for a finite period of time at Step 303. The returned security token will be passed from the security gateway 51a to the client agent 13 at Step 304. Then the process proceeds to Step 305 where the client agent 13 passes this token with each web service request generated by the subscriber. In operation, the subscribing application 11 passes a request to the client agent 13 for each web service access, and in response, the client agent 13, acting on behalf of the subscriber, forms a SOAP message and places the token in an SAML (Security Assertion Mark-up Language) node along with the web service specific payload. This XML encoded message is then sent to the designated web service via HTTPS.

The server agent 36 is positioned on the web service provider platform 300 to intercept each in-coming request by evaluating each arriving SOAP message and inspecting the token included therein. As seen at Step 306, the server agent 36 first determines whether the token has already been cached for the requested web service and operations and then whether the token is within its expiration limit. If the token is in the cache and does not expire, at Step 307 the server agent 36 will allow the web service request to pass into the designated web service and operation. If the token has expired, the server agent 36 will return a token expired SOAP Fault to the client agent 13 at Step 308. The client agent 13 will then acquire a new token and retry the request by repeating the above-described steps.

If the token is not in the cache, the server agent 36 will call the security service 51 by performing the Steps 309-312. At Step 309, the server agent 36 passes to the security gateway 51a the token, the name of the web service being accessed and the operation (method) name being invoked. At Step 310, the security gateway 51a transfers the token and web service request to the policy server 51b that accesses the policy database 52 to evaluate the validity of the token and to verify the subscriber's authority to access the requested web service and operation. If the token is valid and the subscriber is authorized to use the requested web service, at Step 311a positive response—authorization—will be passed back to the security gateway 51a. Once this authorization response is passed to the server agent 36 at Step 312, the server agent 36 will cache the token along with its expiration information and the resources for which it has been authorized. The request will then be passed to the designated service and operation at Step 37. On the other hand, if the token is invalid or the subscriber is not authorized to use the requested web service, a negative response will be transferred back from the policy server 51b to the security gateway 51a and then to the server agent 36. As a result, an access-denied SOAP Fault message will be sent to the client agent 13 at Step 308. In response to this fault message, the client agent 13 will then acquire a new token and retry the request by repeating the above-described steps.

FIG. 4 provides a flow diagram illustrating the runtime security process under a bundled agent pattern according to one embodiment of the present invention. Under the bundled agent model, the client agent 13 in FIG. 3 gives the appearance of "residing" within the server agent 36. Thus, distinct from the process illustrated in FIG. 3, the runtime security process in FIG. 4 starts with Step 401 where the registered application ID and password, included for example in the header of a SOAP message as part of a web service security compliant node, are transmitted to the bundled agent 31 directly. The bundled agent 31, co-resident with the web services 32, intercepts the in-coming request and validates the subscriber's credentials by examining its cache at Step 402. Specifically, the bundled agent 31 determines whether the subscriber's credentials have already been validated for the service and operation being invoked and further, whether the cached authorization is within a defined time frame. If the subscriber credentials are in the cache and have not expired, the request will be allowed to pass into the designated service and operation at Step 403. Otherwise the bundled agent 31 will call the security service 51, which will trigger Steps 404-408. The bundled agent 31 passes to the security gateway 51a the application ID and password, the name of the web service being accessed and the operation (method) name being invoked at Step 404. Then the process proceeds to Step 405 where the security gateway 51a passes the credentials and web service request to the policy server 51b that will access the policy database 52 to confirm the validity of the subscribing application's credentials and to verify the subscriber's authority to access the requested service and operation. At Step 406, a response will be returned from the policy server 51b to the security gateway 51a. The response is either authorization or denial of the access to the requested web service. At Step 407, the response will be passed to the bundled agent 31 which will evaluate the response. Successful validation will cause the bundled agent to cache the subscriber's credentials along with its expiration information and the resources for which it has been authorized at Step 408. Meanwhile, the request is allowed to be passed to the designated web service and operation at Step 403. A negative response will cause an access-denied SOAP Fault to be returned to the subscribing application 11 at Step 409. In response to this fault message, the subscribing application 11 will then retry the request by repeating the above-described steps.

SLA (Service-Level Agreement) Management

Referring to FIGS. 5-6, another advantageous functionality of the system 5, namely, the SLA management, will be described. As is well-known in the art, an SLA typically specifies a set of "contractual" terms between a service provider and a service consumer. In the current context, an SLA works as a web service contract that defines operational metrics related to a given web service provided by a web service publisher or provider to a web service subscriber or consumer. There is one "active" SLA contract at any point between the web service provider and consumer for a given web service. Each contract may have many clauses for each unique metric. It should be noted that any changes to an existing contract will make the contract "inactive" and a new record will be created. An inactive contract will be applied and integrated into reports where this contract was once active. In practice, upon a consumer's request for subscription to a web service, the web service provider may start negotiations with the consumer on the contractual terms in the SLA. This process is usually performed manually or offline (although online/automated negotiations are possible). After the SLA is established, the provider may use a computer-based user interface to configure the SLA into an SLO (Service-Level Objective) that defines what specific metric to measure under the SLA, when the metric is to be measured and what value to look for. An SLO may also includes rules which define when and how the metric should be measured and aggregated and queries that allow the requesting of necessary data. In other words, the configuration of an SLA into an SLO creates executable logic or information that define the details of the SLA in terms that are usable by the system 5. As a result of the configuration, the SLA is saved as a machine-readable SLO, so that the management of SLAs can computerized and integrated into the comprehensive web services management tool.

FIG. 5 provides a detailed view of exemplary application components and process flow for configuring and converting the SLAs into SLOs in the system 5. As seen in FIG. 5, the SLA 2 is received into an SLA engine 20 that comprises at least a configuration interface 21 and a conversion service 22. The configuration interface 21 is provided, for example, to a user to enter the SLA information and then receive and store the SLA information into an SLA repository 24. Responsive to receiving the SLA, the SLA engine 20 will then call the conversion service 22. The conversion service 22 is configured to convert the SLA data into an SLO, including any corresponding rules and queries. Within the system 5, data related to the SLA would be collected continuously or over a period of time (according to the SLO rules) and stored in the SLA database 59. One type of data stored in the SLA database 59 is referred as raw data 59a, which is data that is captured on a real-time basis and not processed by the system 5. Alternatively, there is aggregated data 59b that is derived from raw data and processed by the system 5. Because rules can specify an aggregated value (e.g., downtime during a calendar week), an aggregation service 26 may be used to aggregate measured data values based in large part upon different data life cycles or specified aggregation periods, such as Year/Month/Day/Hr/Min/Sec. The monitoring service 56 and particularly the SLA evaluator 57 are used to measure both raw data 59*a* and aggregated data 59*b* against an SLO. If any breach of SLA is detected, the notification service 55 will be triggered to report the breach. Breach reports can be created and then stored into a database 25 that is accessible to the notification service 55.

Figure 6:
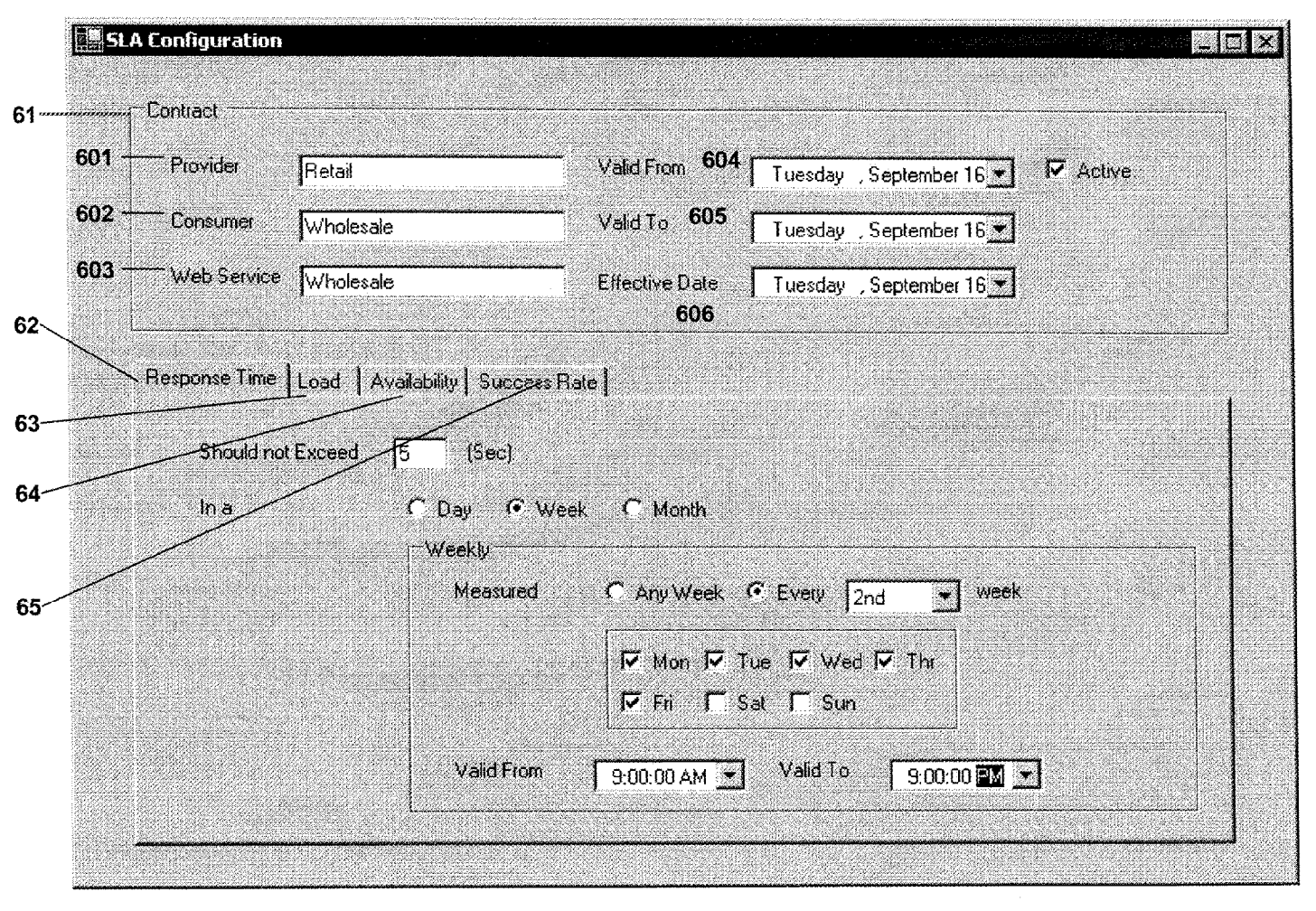

FIG. 6 provides an exemplary screen shot illustrating the configuration interface 21 as shown in FIG. 5 and the SLA configuration process performed by the system 5. As seen in FIG. 6, there is a contract specification area 61 in which a user can provide information related to the SLA, including name of the provider 601, name of the consumer 601, name of the web service 603, the contract valid period defined by a valid-from date 604 and a valid-to date 605, and the contract effective date 606. In this exemplary window, a user can also specify or modify SLA parameters that define the SLA agreement, such as response time 62, load 63, availability 64, and success rate 65. The exemplary screen in FIG. 6 defines a portion of an SLA between provider "Retail" and consumer "Wholesale" agreeing on certain terms for the provision of web service "Wholesale". The terms selected indicate that the parties have agreed that "Wholesale" web service should have a response time of no more than 5 seconds as measured 9 AM-9 PM, Monday through Friday of every second week. Conversion service 22 may then take the information provided through the exemplary configuration interface 21 and generate an SLO reflecting these agreement conditions with appropriate rules and queries.

Various platforms, services, agents, gateways, servers, applications, toolkits and engines are described above. These entities may be comprised of various means including hardware, software, firmware or any combination thereof. For example, the web services consumer/subscriber platform 100, the web services provider/publisher platform 300 and the web services management platform 500 may be comprised of portions of the same or different computing systems that operate under control of software to perform the various functions subscribed to these entities in the foregoing description. Likewise, the gateways and servers, such as the web services security gateway 51*a* and the policy server 51*b*, may be comprised of the same or different computing systems, again operating under control of software to perform the requisite functions. Furthermore, the agents (such as the web service bundled agent 31), services (such as the web services 32), applications (such as the subscribing application 11), toolkits (such as the web service security compliant SOAP toolkit 12) and engines (such as the SLA engine 21) are generally comprised of software, although other embodiments may be implemented in hardware or firmware if desired.

In the preceding specification, embodiments according to the invention have been described. It will, however, be evident that various modifications and changes may be made thereunto without departing from the broader spirit and scope of the invention as set forth in the claims that follow. The specification and drawings are accordingly to be regarded in an illustrative rather than restrictive sense.

That which is claimed:

1. A process comprising:
    receiving, at a server-side web service provider computing platform, a web service request for a particular web service, along with user identification credentials comprising an application identification ("ID") and password, from a web service subscribing application within a client-side computing platform, said web service request and said user identification credentials received into a service agent executing within the server-side web service provider computing platform;
    determining by the service agent executing within the server-side web service provider computing platform whether said user identification credentials are cached in a cache in said service agent, and further, whether said user identification credentials are valid, and further, whether said user identification credentials are associated with the requested particular web service in said cache in said service agent;
    in response to a determination that said user identification credentials are not cached in said service agent, communicating, by the service agent executing within the server-side web service provider computing platform, with a security gateway within a web service management platform that is separate from both said client-side computing platform and said server-side web service provider computing platform to authorize said subscribing application within said client-side computing platform to access said particular web service, said communicating being transparent to said client-side computing platform;
    in response to the determination that said user identification credentials are cached in said service agent and are invalid, sending by the server-side web service provider computing platform a response to said web service subscribing application within said client-side computing platform with an error message; and
    in response to the determination that said user identification credentials are cached in said service agent, are valid, and are associated with the requested particular web service in said cache in said service agent, passing by the service agent executing within the server-side web service provider computing platform said particular web service request received from said subscribing application to said web service to access said requested particular web service in said server-side web service provider computing platform in accordance with a service level agreement between a web service subscriber and a server-side provider to provide said particular web service to said web service subscribing application;
    wherein said service agent executing within the server-side web service provider computing platform does not receive information about said security gateway along with said web service request received from said web service subscribing application.

2. The process of claim 1, further comprising:
    receiving, by said security gateway, said web service request and said user identification credentials from said service agent executing within the server-side web service provider computing platform; and
    returning, by said security gateway, a response to said service agent executing within the server-side web service provider computing platform, said response comprising an authorization or a denial of said web service request.

3. The process of claim 2, further comprising:
    determining, by said service agent, said response is an authorization of said web service request;
    responsive to said determination, caching, by said service agent, said user identification credentials and data identifying the requested particular web service in said cache in said service agent; and
    passing, by said service agent, said web service request to said particular web service for access.

4. The process of claim 2, further comprising:
determining, by said service agent, said response is a denial of said web service request; and
responding, by said service agent, to said web service subscribing application within the client-side computing platform with an error message.

5. The method of claim 3, further comprising caching expiration information along with said user identification credentials in said cache in said service agent.

6. The method of claim 1, wherein said web service request and said user identification credentials are received in a Simple Objects Access Protocol ("SOAP") message.

7. The method of claim 6, wherein said user identification credentials are included in a header of said SOAP message.

8. The method of claim 1, wherein said determining whether said user identification credentials are valid comprises determining whether said user identification credentials are within a defined time frame.

9. The process of claim 1, wherein said web service subscriber comprises a developer of said subscribing application.

10. A process comprising:
receiving data traffic representative of a web service request for a particular web service, along with user identification credentials comprising an application identification ("ID") and password, from a web service subscribing application within a client-side computing platform via a network, said web service request for said particular web service and said user identification credentials received into a service agent executing within a server-side web service provider computing platform;
determining by said service agent that said user identification credentials are not cached in said service agent;
transmitting, by said service agent via said network in a manner that is transparent to said client-side computing platform, data traffic representative of said user identification credentials and a name of said requested web service to a security gateway within a web service management platform that is separate from said client-side computing platform and said server-side web service provider computing platform;
receiving, by said service agent in a manner that is transparent to said client-side computing platform, data traffic representative of a response from said security gateway via said network, said response comprising an authorization to access said requested web service;
passing, by said service agent, said web service request for said particular web service received from said web service subscribing application to a web service provider computer application executing within said server-side web service provider computing platform to access said requested particular web service in said server-side web service provider computing platform in accordance with a service level agreement between a web service subscriber and a server-side provider to provide said particular web service to said web service subscribing application; and
caching, by said service agent, said user identification credentials, expiration information for said user identification credentials, and data identifying said requested web service;
wherein said service agent executing within the server-side web service provider computing platform does not receive information about said security gateway along with said web service request for said particular web service received from said web service subscribing application within said client-side computing platform.

11. A system comprising:
a web service provider computer application within a server-side computing platform and configured to provide a web service over a network; and
a web service agent co-resident with said web service provider computer application within said server-side computing platform and configured to
receive, via said network, a web service request for said web service, along with user identification credentials comprising an application identification ("ID") and password, from a web service subscribing application within a client-side computing platform,
determine whether said user identification credentials are cached in said web service agent, and further, whether said user identification credentials are valid,
in response to a determination that said user identification credentials are not cached in said web service agent, call a security service provided by a web service management platform that is separate from said client-side computing platform and said server-side computing platform to authorize said web service subscribing application within the client-side computing platform to access said web service,
in response to a determination that said user identification credentials are cached in said web service agent and are invalid, send an error message to said web service subscribing application within the client-side computing platform via said network, and
in response to a determination that said user identification credentials are cached in said web service agent and are valid, pass said web service request received from said web service subscribing application to said web service provider computer application to access said requested web service in said server-side web service provider computing platform in accordance with a service level agreement between a web service subscriber and a server-side provider to provide said particular web service to said web service subscribing application; and
a security gateway within said web service management platform that is separate from said client-side computing platform and said server-side computing platform and in communication with said web service agent via said network;
wherein, when initiated by said call to said security service, said security gateway
receives, in a manner that is transparent to said client-side computing platform, said user identification credentials and a name of said web service being accessed from said web service agent via said network,
passes, in a manner that is transparent to said client-side computing platform, said user identification credentials and said name of said web service being accessed to a policy server,
receives, in a manner that is transparent to said client-side computing platform, a response from said policy server, said response comprising an authorization or a denial of access to said web service, and
passes, in a manner that is transparent to said client-side computing platform, said response to said web service agent via said network.

12. The system of claim 11, wherein said web service agent is configured to
- call said security service by transmitting, to said security gateway via said network, said user identification credentials and said name of said web service being accessed,
- receive said response from said security gateway via said network, and
- evaluate said response.

13. The system, of claim 12, wherein in response to said response including an authorization to access said web service, said web service agent is configured to
- pass said web service request to said web service provider computer application for access, and
- cache said user identification credentials, expiration information for said user identification credentials, and data identifying said web service.

* * * * *